Patented May 19, 1931

1,806,034

UNITED STATES PATENT OFFICE

KARL BECK AND HERBERT KRACKER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

WATER-INSOLUBLE AZO DYESTUFFS AND MATERIAL DYED THEREWITH

No Drawing. Application filed December 5, 1928, Serial No. 324,052, and in Germany December 17, 1927.

Our present invention relates to new water-insoluble azo dyestuffs and material dyed therewith.

We have found that dyestuffs of excellent fastness are obtained by coupling a diazo compound of a dihalogenated 2-amino-1-toluene containing one halogen atom in 6: position and the other in 3: - or 5: position of the general formula:

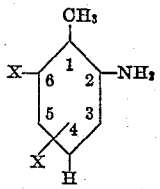

wherein both the X's stand for halogen, with an arylamide of 2.3-hydroxynaphthoic acid.

The dyestuffs obtained by our invention correspond to the general formula:

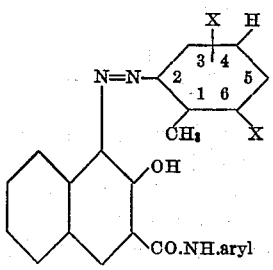

wherein both the X's stand for halogen and wherein the aryl residue may be substituted or not but must not contain any free sulfonic- or carboxylic groups.

The dyestuffs can be produced in substance or on the fiber.

The following examples illustrate our invention but they are not intended to limit it thereto, the parts being parts by weight:

1. 50 g. of well boiled cotton yarn are treated with the grounding liquor for half an hour, well freed from water by wringing it out or by centrifugating it and dyed for one minute in the diazo solution. The dyed yarn is then thoroughly rinsed, soaped at boiling temperature and again rinsed.

The grounding liquor is prepared as follows:

4.5 g. of 2.3-hydroxynaphthoic acid-2′.5′-dimethoxy-1′-anilide
9 cc. of sodium Turkey red oil of 50% strength
11.25 cc. of caustic soda solution of 34° Bé. are dissolved in boiling water; after cooling
4.5 cc. of formaldehyde of 30% strength are added and the whole is made up to 1 liter.

The developing bath is prepared as follows:

3.5 g. of 5.6-dichloro-2-amino-1-toluene are made into a paste with
5.2 cc. of hydrochloric acid of 22° Bé, and a small quantity of water;
1.44 g. of dissolved sodium nitrite and some ice are gradually added. After the diazotization is complete, the solution is neutralized with
4 g. of sodium acetate and the whole is made up to 1 liter.

The dyestuff has the formula:

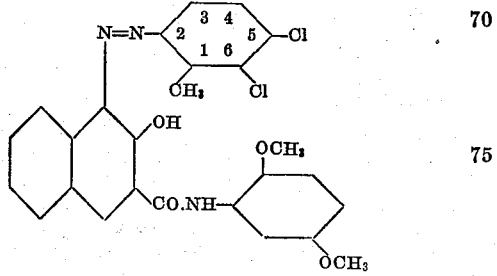

The dyeing has a vivid, bluish-red shade.

2. The grounding liquor is prepared as follows:

4.5 g. of 2.3-hydroxynaphthoic acid-4′-chloro-2′-anisidide
9 cc. of sodium Turkey red oil of 50% strength
11.25 cc. of caustic soda solution of 34° Bé. are dissolved in hot water and the solution is cooled to about 50° C.;
4.5 cc. of formaldehyde of 30% strength are then added and the whole is made up to 1 liter.

The developing bath is prepared as follows:

- 4.4 g. of 5-bromo-6-chloro-2-amino-1-toluene with a small quantity of water and
- 9 cc. of sodium Turkey red oil of 50% strength
- 11.25 cc. of caustic soda solution of 34° Bé. are dissolved in hot water; the solution is cooled to about 50° C. and
- 4.5 cc. of formaldehyde of 30% strength are added and the whole is made up to
- 1 liter.

The dyeing has a vivid scarlet shade of good fastness properties.

3. 17.6 parts of 3.6-dichloro-2-amino-1-toluene are diazotized in known manner with hydrochloric acid and nitrite; the diazo solution thus obtained is run, while well stirring, into an aqueous suspension of 31 parts of 2.3-hydroxynaphthoic acid-4'-anisidide prepared by dissolving the latter in dilute caustic soda solution and reprecipitating with dilute acetic acid. The dyestuff precipitates in the form of vivid red flakes; it is filtered off after the coupling is complete, washed until neutral and advantageously used in a paste form. When dried, it is a yellowish-red powder.

The following table illustrates the shades of some of the new dyestuffs or the color lakes which are obtained thereof, respectively:

| Diazo compound from | Combined with | Shade of the dyestuff and the lake obtained thereof, respectively |
|---|---|---|
| 5.6-dichloro-2-amino-1-toluene. | 2.3-hydroxynaphthoic acid para-anisidide. | Bluish-red. |
| 5.6-dichloro-2-amino-1-toluene. | 2.3-hydroxynaphthoic acid ortho-anisidide. | Bluish-red. |
| 5.6-dichloro-2-amino-1-toluene. | 2.3-hydroxynaphthoic acid 4'-chloro-2'-anisidide. | Vivid scarlet. |
| 5.6-dichloro-2-amino-1-toluene. | 2.3-hydroxynaphthoic acid 5'-chloro-2'-anisidide. | Bluish-red. |
| 5.6-dichloro-2-amino-1-toluene. | 2.3-hydroxynaphthoic acid 2'-chloro-4'-anisidide. | Brick-red. |
| 5.6-dichloro-2-amino-1-toluene. | 2.3-hydroxynaphthoic acid α-naphthalide. | Claret-red. |
| 5-bromo-6-chloro-2-amino-1-toluene. | 2.3-hydroxynaphthoic acid para-anisidide. | Bluish-red. |
| 5-bromo-6-chloro-2-amino-1-toluene. | 2.3-hydroxynaphthoic acid 2'.5'-dimethoxy-1'-anilide. | Bluish-red. |
| 5-bromo-6-chloro-2-amino-1-toluene. | 2.3-hydroxynaphthoic acid α-naphthalide. | Claret-red. |

We claim:

1. As new products, the water-insoluble azo dyestuffs of the following formula:

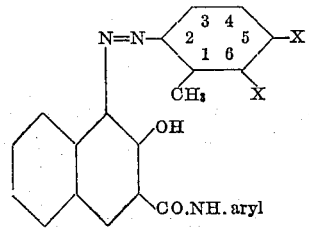

wherein both the X's stand for equal or different halogen atoms, of which the one not standing in a fixed position may stand in 3:- or in 5: position and wherein the aryl residue may be substituted or not, but must not contain any free sulfonic- or carboxylic groups, dyeing red shades fast to light.

2. As new products, the water-insoluble azo dyestuffs of the following formula:

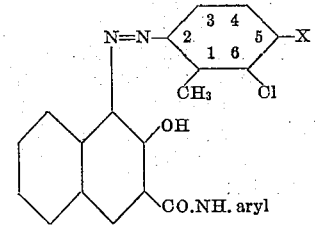

wherein both the X's stand for equal or different halogen atoms, and wherein the aryl residue may be substituted or not but must not contain any free sulfonic- or carboxylic groups, dyeing red shades fast to light.

3. As new products, the water-insoluble azo dyestuffs of the following formula:

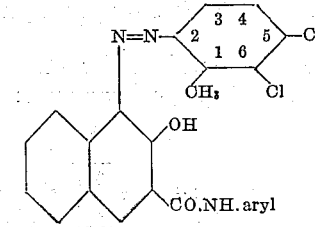

wherein X stands for Cl or Br and wherein the aryl residue may be substituted or not but must not contain any free sulfonic or carboxylic groups, dyeing red shades fast to light.

4. As new products, the water-insoluble azo dyestuffs of the following formula:

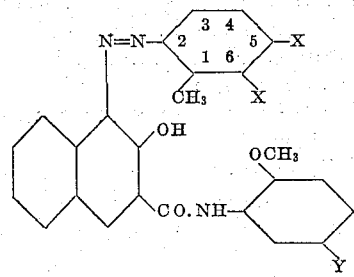

wherein the aryl residue may be substituted or not, but must not contain any free sulfonic- or carboxylic groups, dyeing red shades fast to light.

5. As new products, the water-insoluble azo dyestuffs of the following formula:

wherein both the X's stand for equal or different halogen atoms, and wherein Y stands for hydrogen or the $OCH_3$-group, dyeing red shades fast to light.

6. As new products, the water-insoluble azo dyestuffs of the following formula:

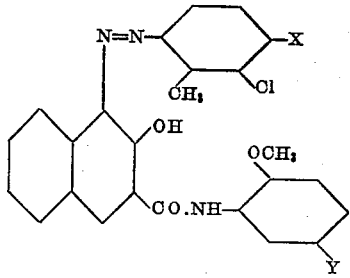

wherein X stands for Cl or Br and Y stands for hydrogen or the $OCH_3$-group, dyeing red shades fast to light.

7. As new products, the water-insoluble azo dyestuffs of the following formula:

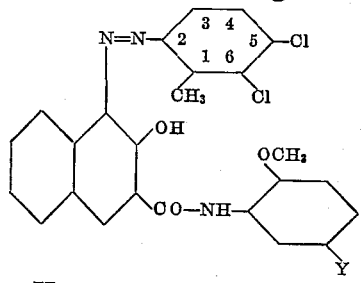

wherein Y stands for hydrogen or the $OCH_3$-group, dyeing red shades fast to light.

8. As a new product, the water-insoluble azo dyestuff of the following formula:

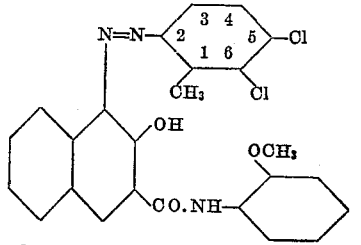

dyeing a bluish-red shade fast to light.

9. Material dyed with dyestuffs as claimed in claim 1.

10. Material dyed with dyestuffs as claimed in claim 2.

11. Material dyed with dyestuffs as claimed in claim 3.

12. Material dyed with dyestuffs as claimed in claim 4.

13. Material dyed with dyestuffs as claimed in claim 5.

14. Material dyed with dyestuffs as claimed in claim 6.

15. Material dyed with dyestuffs as claimed in claim 7.

16. Material dyed with the dyestuff as claimed in claim 8.

In testimony whereof, we affix our signatures.

KARL BECK.
HERBERT KRACKER.